Figure 1:
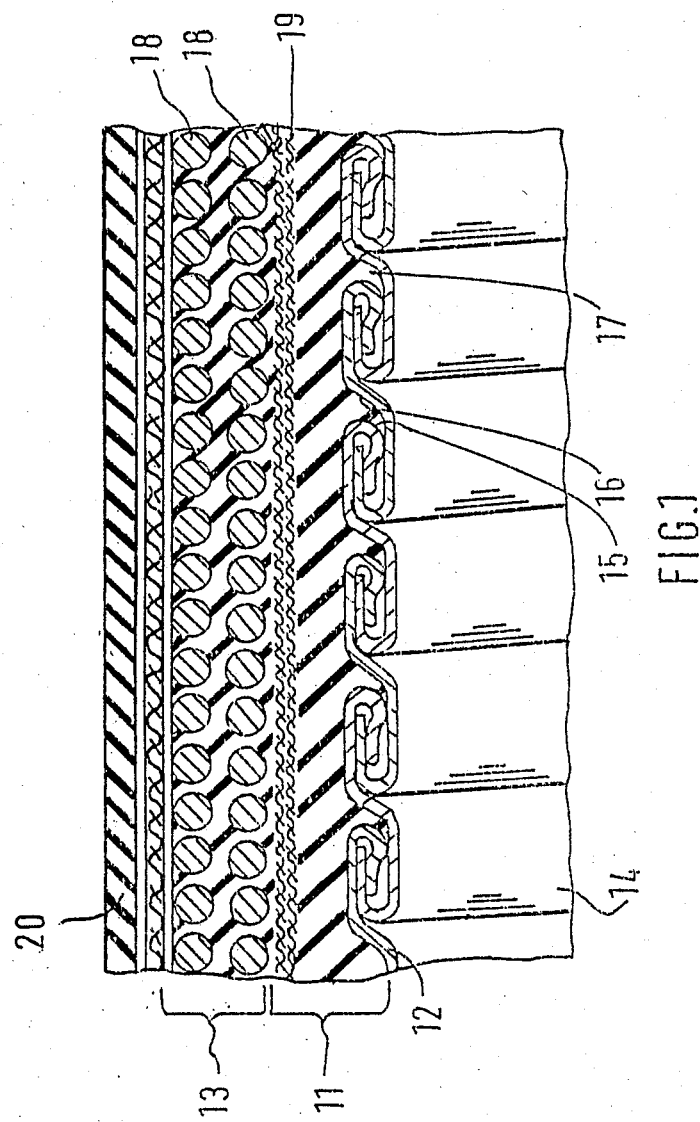

United States Patent [19]

Griffiths

[11] Patent Number: 4,727,909
[45] Date of Patent: Mar. 1, 1988

[54] HOSE
[75] Inventor: Alan D. Griffiths, Binbrook, England
[73] Assignee: Dunlop Limited a British Company, United Kingdom
[21] Appl. No.: 14,163
[22] Filed: Feb. 11, 1987

Related U.S. Application Data

[63] Continuation of Ser. No. 680,474, Dec. 11, 1984, abandoned.

[30] Foreign Application Priority Data

Aug. 21, 1984 [GB] United Kingdom ............... 84/21238

[51] Int. Cl.4 ............................................. F16L 11/08
[52] U.S. Cl. .................................... 138/127; 138/125; 138/131; 138/132
[58] Field of Search ............... 138/125, 127, 130, 131, 138/132, 133, 174, DIG. 6

[56] References Cited

U.S. PATENT DOCUMENTS

| | | | |
|---|---|---|---|
| 1,692,255 | 11/1928 | Fulton | 138/127 X |
| 2,438,146 | 3/1948 | Candee et al. | 138/127 X |
| 3,459,233 | 8/1969 | Webbe | 138/131 |
| 3,711,570 | 11/1973 | Coleman | 138/131 |
| 3,712,841 | 1/1973 | Skinner et al. | 156/144 |

FOREIGN PATENT DOCUMENTS

| | | |
|---|---|---|
| 2268614 | 4/1974 | France . |
| 373302 | 3/1931 | United Kingdom . |
| 1209474 | 10/1966 | United Kingdom . |
| 1353760 | 6/1971 | United Kingdom . |

Primary Examiner—Mark John Thronson
Attorney, Agent, or Firm—Stevens, Davis, Miller & Mosher

[57] ABSTRACT

A flexible hose suitable for transporting crude oil has a fluid sealing layer of flexible polymeric material disposed between radially inner and radially outer support layers which resist any tendency for the polymeric material to expand.

The inner support layer is formed by at least one helically wound element the successive turns of which are interlocked and define in the outer surface of the inner support layer a helically extending crevice, and the surrounding polymeric material is arranged to substantially wholly fill said crevice.

13 Claims, 2 Drawing Figures

HOSE

This application is a continuation of application Ser. No. 680,474, filed Dec. 11, 1984, now abandoned.

This invention relates to hose and in particular, though not exclusively, to flexible hose suitable for the transportation of a corrosive fluid, such as crude oil, under a high pressure.

In accordance with the present invention a flexible hose comprises a layer of flexible polymeric material disposed between a radially inner support layer and a radially outer support layer whereby any tendency for the polymeric material to expand in response to contact with corrosive fluid is resisted by said support layers, the inner support layer comprising at least one helically wound element the successive turns of which are interlocked and arranged to define in the radially outer surface of the inner support layer at least one helically extending crevice, characterised in that the layer of flexible polymeric material extends into and substantially wholly fills said at least one helically extending crevice.

Preferably the layer of polymeric material is formed in situ by an extrusion process, the process of extrusion being controlled in such manner that said at least one helically extending crevice becomes substantially wholly filled with the polymeric material during the extrusion process. Preferably the polymeric material wholly fills the crevice(s).

Where the polymeric material is a vulcanisable or curable material, vulcanisation or cure preferably is effected after the extrusion process and more preferably after any additional layers of the hose have been applied around said polymeric material.

In order to provide a hose the flexibility of which is not significantly impaired as a result of the crevice(s) being substantially wholly filled with polymeric material it is believed that in general the polymeric material should be an elastomeric material and more particularly an elastomeric material of a kind having an elongation at break in the range 200 to 500%.

Preferably the polymeric material is an elastomeric material such as a chemically saturated elastomer and more preferably a chemically saturated elastomer of a kind which when exposed to crude oil will swell by at least 10%, more preferably by at least 20% of its original volume in the absence of external constraint. In consequence it is believed that the resulting hose is particularly suitable (with additional layers of reinforcement as appropriate) for the transportation of pressurised crude oil. This arises because after an initial period of exposure to crude oil the elastomer will swell to bear firmly against the radially inner and outer support layers and surfaces of the crevice(s), and any rapid decompression such as commonly occurs in hose used for the transportation of crude oil will result in the elastomer forming a good seal and being supported by the crevice(s). Accordingly by virtue of the full surface support and constraint of the elastomer by the inner and outer support layers there is avoided the problem that otherwise would be expected to arise in the event of rapid decompression if use were made of elastomers such as those of a kind which swell by more than 10 or 20% when exposed to crude oil, namely the problem of degradation of the elastomer by explosion or like effect.

It is further preferred that as considered in a plane containing the longitudinal axis of the hose the crosssectional shape of the or each crevice is such that the width of the crevice, as considered in a direction parallel to said longitudinal axis, increases with increasing distance from the longitudinal axis. Said cross-sectional shape of the crevice is referred to herein as "wedge-like".

The wedge-like profile of a crevice may be symmetrical or asymmetric. Preferably it is asymmetric and of a kind wherein an imaginary line drawn (in said plane containing the longitudinal axis) to lie midway between the sides of the crevice is of a curved shape. It is believed that in consequence the polymeric material in the crevice(s) is able more readily to continue to bear in fluid tight contact against the walls of the crevice notwithstanding flexing of the hose and associated small changes in the shape of the crevice that would be the case if the crevice(s) were of a symmetrical or other shape the "midway" line of which is substantially straight.

The outer support layer may be of an interlocked construction or may comprise one or more layers of helically extending wire, e g high tensile steel reinforcement wire. When the outer support layer comprises a helically extending wire, preferably the wire is wound such that neighbouring turns of wire in a wire layer are slightly spaced. In order to provide adequate radially outer support to the layer of polymeric material it is preferred that a radially outer portion of said layer of polymeric material has embedded therein a layer of textile reinforcement fabric, preferably a high tenacity textile fabric.

The inner support layer, and outer support layer when of an interlocked construction, preferably comprises a helically wound strip having a double folded configuration whereby successive turns are interlocked against separation in both the radial and axial directions of the hose.

Figure 2:
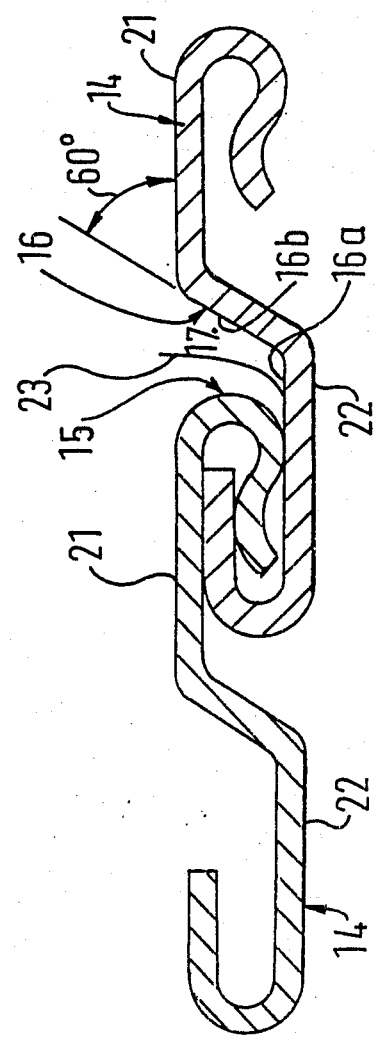

One embodiment of the invention will now be described, by way of example, with reference to the accompanying diagrammatic drawings wherein:

FIG. 1 is a longitudinal cross-sectional view of part of a hose in accordance with the present invention, and FIG. 2 shows in detail a part of the hose of FIG. 1.

A flexible hose for the transportation of crude oil under high pressure comprises a polymeric layer 11 of extruded elastomeric material such as elastomeric polyacrylate disposed between an inner support layer 12 and an outer support layer 13. The polyacrylate is a chemically saturated elastomer of a kind which when exposed to crude oil would, in the absence of the constraint provided by the inner and outer support layers, swell by at least 50% of its original volume.

The inner support layer 12 is formed from one helically wound stainless steel strip 14 of a double folded S-shape configuration in cross-section and arranged such that successive turns of the strip are in interlocked relationship one with the other. The confronting surface portions 15, 16 of the strip define therebetween a helically extending crevice 17 the shape of which is described in more detail below. The elastomeric polyacrylate is caused to fill completely the crevice 17 during the extrusion process.

The outer support layer 13 comprises high tensile steel reinforcement wires 18 arranged in two layers with the wires of one layer extending helically relative to the length of the hose in an opposite twist direction to the wires of the other layer thereby to form a balanced pair of wire reinforcement layers.

The outer support layer 13 is assisted in constraining expansion of the polyacrylate layer 11 by a layer 19 of high tenacity fabric, such as woven rayon fabric, embedded in the radially outermost region of the layer 11.

The hose additionally comprises an abrasion resistant neoprene outer cover layer 20.

The shape of the crevice 17 will now be desribed in more detail.

Referring to FIG. 2, the surface 21 of the strip is that over which the polyacrylate layer 11 is extruded and the surface 22 is that which defines the bore of the hose.

The crevice is defined by the space between the confronting surface regions 15, 16 of the strip 14. One region 15 is of a convex shape whilst the other 16 comprises an axially extending portion 16a and inclined portion 16b. The angle of inclination of portion 16b relative to the length of the hose preferably is in the range 45° to 88°, more preferably 60°. The radius of curvature of the region 15 is defined by the geometry of the double folded strip and is one half of the difference between the overall thickness (as considered radially of the hose) of the flexible strip and the thickness of the material forming the strip. An imaginary line 23 drawn to lie midway between the confronting surface portions 15 and 16b has a curved profile.

I claim:

1. A flexible high pressure oil transportation hose for transportation of crude oil under high pressure, said hose comprising a layer of flexible polymeric material of a kind which when exposed to crude oil will swell by at least 10% of its original volume in the absence of external constraint, a radially inner support layer and a radially outer support layer between which said layer of polymeric material is disposed such that said support layers resist any tendency for the polymeric material to expand in response to contact with corrosive fluid, the inner support layer comprising at least one helically wound element, the successive turns of which are interlocked and arranged to define in the radially outer surface of the inner support layer at least one helically extending crevice of a wedge-like shape in cross-section, as considered in a plane containing the longitudinal axis of the hose, wherein the width of the crevice, in a direction parallel to the longitudinal axis of the hose, increases with increasing distance from the longitudinal axis, and said layer of flexible polymeric material being arranged to extend into and substantially wholly fill said at least one helically extending crevice.

2. A flexible hose according to claim 1, wherein said wedge-like shape of said crevice comprises an asymmetric shape.

3. A flexible hose according to claim 2 wherein the asymmetric shape of said crevice is such that an imaginary line drawn in said plane containing the longitudinal axis to lie mid-way between the sides of the crevice is of a curved shape.

4. A flexible hose according to claim 1 wherein the layer of polymeric material is an extruded layer.

5. A flexible hose according to claim 1 wherein said polymeric material wholly fills said crevice.

6. A flexible hose according to claim 1 wherein the polymeric material is an elastomeric material.

7. A flexible hose according to claim 6 wherein said elastomeric material has an elongation at break in the range 200 to 500%.

8. A flexible hose according to claim 6 wherein the elastomeric material is a chemically saturated elastomer.

9. A flexible hose according to claim 1 wherein the outer support layer comprises a helically extending wire neighbouring turns of which are slightly spaced.

10. A flexible hose according to claim 9 wherein a radially outer portion of the layer of polymeric material has embedded therein a layer of textile reinforcement fabric.

11. A flexible hose according to claim 10 wherein said layer of textile fabric is of high tenacity.

12. A flexible hose according to claim 1 wherein at least one of said support layers comprises a helically wound strip of a kind having a double folded configuration whereby successive turns are interlocked against separation in both the radial and axial directions of the hose.

13. A flexible high pressure oil transportation hose for transportation of crude oil under high pressure, comprising:
 an extruded layer of an elastomeric material which has an elongation at break in the range 200 to 500% and which when exposed to crude oil will swell by at least 10% of its original volume in the absence of external constraint;
 a radially inner support layer and a radially outer support layer between which said layer of elastomeric material is disposed;
 at least the inner of said support layers comprising at least one helically wound strip of a kind having in cross-section a double folded configuration whereby successive turns of the support layer are interlocked against separation in both the radial and axial directions of the hose, said at least one helically wound strip defining in the radially outer surface of the radially inner support layer at least one helically extending crevice of a wedge-like shape wherein the width of the crevice, in a direction parallel to the longitudinal axis of the hose, increases with increasing distance from the longitudinal axis, and said crevice being substantially wholly filled by said layer of elastomeric material.

* * * * *